J. R. GEORGE.
HOUSING FOR ROLLING MILLS.
APPLICATION FILED NOV. 3, 1915.
1,221,043.
Patented Apr. 3, 1917.
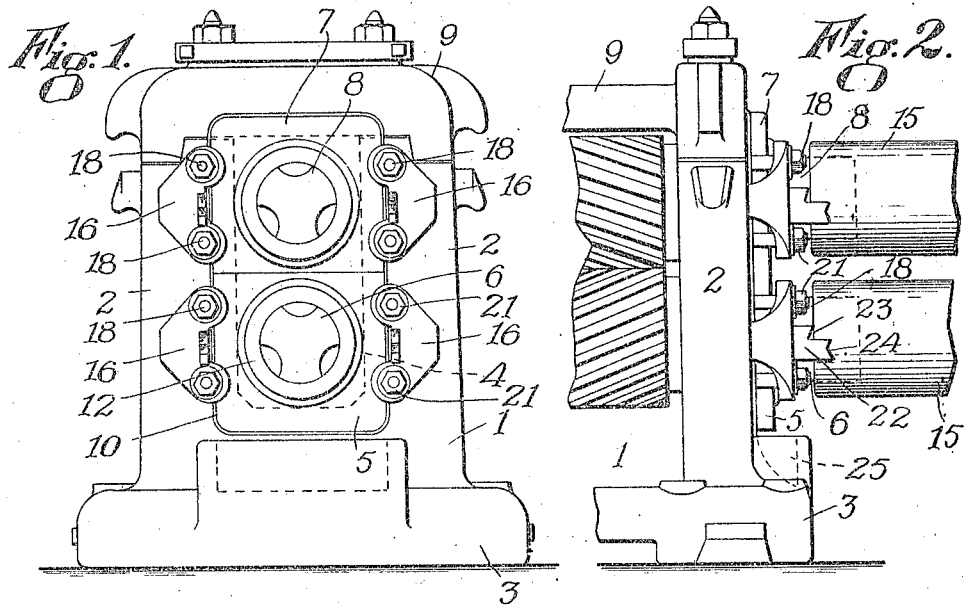
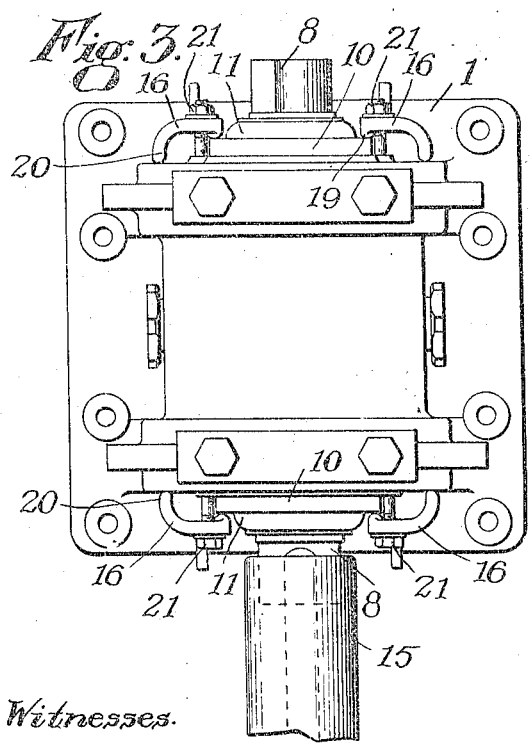
Witnesses.
R. D. Tolman.
Penelope Comberbach.
Inventor
Jerome R. George.
By Fowler & Kennedy
Attorneys.

UNITED STATES PATENT OFFICE.

JEROME R. GEORGE, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

HOUSING FOR ROLLING-MILLS.

1,221,043.  Specification of Letters Patent.  Patented Apr. 3, 1917.

Application filed November 3, 1915. Serial No. 59,472.

*To all whom it may concern:*

Be it known that I, JEROME R. GEORGE, a citizen of the United States, residing at Worcester, in the county of Worcester and Commonwealth of Massachusetts, have invented a new and useful Improvement in a Housing for Rolling-Mills, of which the following, together with the accompanying drawings, is a specification.

The present invention relates to the construction of a pinion housing designed to contain the pinions used for driving the rolls of a rolling mill, and has particular reference to the provision of suitable devices for retaining the bearings for such pinions in position, and at the same time affording a means for facilitating the disengagement of the pinions from their connections with the rolls, in order to permit the removal of the bearings and the pinions from the housing.

The invention is set forth in detail in the following description, reference being had to the accompanying drawings, in which—

Figure 1 is an end view of a pinion housing embodying my invention.

Fig. 2 is a view in side elevation of a portion of the housing shown in Fig. 1, and also illustrating the couplings between the pinions and the rolls.

Fig. 3 is a top plan view of the housing, and

Fig. 4 is a perspective view of a dog, or retaining plate, for the bearings of the pinions.

Similar reference characters refer to similar parts in the different figures.

The housing, designated as a whole by the numeral 1, may be of ordinary construction, providing end walls 2, 2 rising from a base 3. As shown in the drawings, each end wall is centrally recessed from the top, as indicated by the dotted lines 4, Fig. 1, to receive a bearing 5 for the shaft 6 of the lower pinion, and a superposed bearing 7 for the shaft 8 of the upper pinion. The usual cap or cover 9 spans the space between the walls 2, 2 and closes the upper ends of recesses 4, 4 in the usual manner, thereby retaining the bearings 5 and 7 therein.

As shown, each of the bearings 5, 7, which may be of any well-known construction, provides side flanges 10, 10 overlapping the edges of the recess 4, and seating against the outer face of the wall 2, thereby preventing inward displacement of the bearing.

The pinion shafts 6 and 8 project through the usual central bosses 11, 11 of the bearings, and are grooved at their ends, as shown at 12, Fig. 1, for operative connection to the shafts of the rolls, not shown, by means of the usual sliding coupling collars 15, Figs. 2 and 3.

The bearings 5 and 7 are secured against outward displacement by means of a pair of dogs or retaining plates, 16 one of which is shown detached in Fig. 4. Each dog 16 provides a pair of spaced apertured ears 17, through which loosely pass bolts 18, 18, projecting from the wall 2 near the vertical edges of the flanges 10 of the bearings 5 and 7. Each ear has a lug 19 formed on its inner surface, the pair of dogs thereby providing contact with the flange 10 at two points on each side, near the corners of said flange. Each dog 16 provides an inwardly turned tongue 20, adapted to bear at a single point against the face of wall 2, when the dog is in position. Nuts 21, when screwed down on the bolts 18 against the face of the dog, force the latter into firm three-point engagement with the flange 10 and wall 2, the loose passage of the bolts through the apertures of the ears 17 permitting free movement of the dog to carry each lug 19 against the face of flange 10, and to carry the end of tongue 20 into contact with the face of wall 2. In this manner, each side of the bearing is pressed firmly inward against the face of wall 2 and held against displacement, until the nuts 21 are removed, permitting the removal of the dogs and the withdrawal of the bearing from the housing.

Each dog 16 provides an outwardly extending projection 22, disposed between the ears 17 thereof. This projection 22 is shouldered at an intermediate point, 23, providing a fulcrum to support a lever or crowbar, when it is desired to pry the corresponding collar 15 outwardly, in order to disconnect the pinion shaft 6 or 8 from the corresponding roll shaft, not shown. One or more of said intermediate shoulders may be provided, to permit the fulcrum of the lever to be shifted, as the collar is gradually moved outwardly. The end of the projection 22 is suitably notched, as at 24, to provide an additional fulcrum point for the lever, in obtaining the final movement of the collar 15. In this manner the dogs 16 provide a means for facilitating the disengagement of the rolls from the pinions, in addition to their function as retaining devices for the bearings 5 and 7.

As shown in Figs. 1 and 2, the base 3 provides, beneath the outer ends of the bearings 5 and 7, a trough or other receptacle 25 open at the top to catch the oil and grease which overflows from the bearings 5 and 7, thereby preventing the spreading of lubricant on the floor of the mill.

With a housing of the type shown, the bearings are removable through the top thereof, as well as longitudinally; it will be seen that by merely loosening the nuts 21 on the bolts 18, without removing the retaining dogs 16, the bearings 5 and 7 can be withdrawn through the top of the housing.

It will be further seen that each removable retaining member 16 is in effect a lever, reacting, through the tongue 20 against the face of the housing. The disposition of the projections 22 on said members 16, instead of on the housing, affords a decided advantage; if made integral with the housing, these projections could not be replaced, if broken off. But with the present arrangement, a new retaining dog can be easily substituted, at small cost, if a projection 22 becomes broken off.

I claim:

1. The combination, with a housing of a bearing supported therein, a shaft in said bearing and a coupling slidable on said shaft, and removable means independent of said housing, providing a plurality of successive fulcrum points for the application of a lever to slide said coupling along said shaft.

2. The combination with a housing, of a bearing supported therein, a retaining device for said bearing adapted to make three-point contact with said bearing and said housing, and means for restraining said device against movement away from said housing intermediate its points of contact with said housing and bearing respectively.

3. The combination with a housing, of a bearing supported therein, a retaining device for said bearing adapted when in position to contact with said bearing at two points and with said housing at a single point, whereby to provide a three-point engagement for said device, and means disposed intermediate the points of contact with said housing and bearing respectively for restraining said device against movement away from said housing.

4. The combination, with a shaft, a bearing, and a coupling slidable on said shaft, of a retaining member for said bearing, providing a plurality of successive fulcrum points for the application of a lever to slide said coupling along said shaft.

5. The combination, with a shaft, a bearing, and a coupling slidable on said shaft, of a retaining member for said bearing, and a projection on said retaining member providing a series of successive axial supporting points for a lever, to slide said coupling along said shaft.

Dated this first day of November 1915.

JEROME R. GEORGE.

Witnesses:
WILLARD A. WINN,
PAULINE HAAS.